United States Patent
Ngo et al.

(10) Patent No.: US 10,841,004 B2
(45) Date of Patent: *Nov. 17, 2020

(54) SYSTEM AND METHOD FOR OPTICAL TIME-DOMAIN REFLECTOMETRY AND DESIGN DATA WIRE TESTING

(71) Applicant: The Boeing Company, Chicago, IL (US)

(72) Inventors: Nam V. Ngo, Summerville, SC (US); Brandon M. Courter, Mt. Pleasant, SC (US); Scott C Farner, Daniel Island, SC (US); Joseph M. Dray, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,893

(22) Filed: Feb. 13, 2019

(65) Prior Publication Data
US 2019/0181949 A1    Jun. 13, 2019

Related U.S. Application Data

(63) Continuation of application No. 15/432,223, filed on Feb. 14, 2017, now Pat. No. 10,230,459.

(51) Int. Cl.
*H04B 10/071*     (2013.01)
*G06F 16/22*      (2019.01)
(Continued)

(52) U.S. Cl.
CPC ........... *H04B 10/071* (2013.01); *G06F 16/22* (2019.01); *H04B 10/0791* (2013.01);
(Continued)

(58) Field of Classification Search
None
See application file for complete search history.

(56) References Cited

U.S. PATENT DOCUMENTS 4,414,539 A   11/1983 Armer
4,428,078 A    1/1984 Kuo
(Continued)

OTHER PUBLICATIONS

US Patent and Trademark Office; Office Action for U.S. Appl. No. 15/432,223 dated Mar. 19, 2018.
(Continued)

*Primary Examiner* — Li Lir
(74) *Attorney, Agent, or Firm* — The Small Patent Law Group LLC; Joseph M Butscher

(57) ABSTRACT

A system for testing continuity of a cable assembly includes an optical time domain reflectometry (OTDR) device selectively coupled to an input connector of a cable and a design database storing cable data. The cable data indicates at least a length of the cable. The system includes a processor and memory in communication with the processor. The processor is configured to execute instructions stored on the memory which cause the processor to receive the cable data from the design database, receive OTDR data associated with the cable from the OTDR device, and calculate a distance-to-fault based on the OTDR data. In response to the distance-to-fault being less than the length of the cable, the processor determines that a connectivity failure has occurred with the cable and generates fault data indicating the connectivity failure.

20 Claims, 6 Drawing Sheets

(51) Int. Cl.
  *H04B 10/079* (2013.01)
  *H04L 12/26* (2006.01)
  *H04Q 11/00* (2006.01)
  *G06T 11/60* (2006.01)

(52) U.S. Cl.
  CPC ....... *H04B 10/0795* (2013.01); *H04L 43/045* (2013.01); *H04Q 11/0005* (2013.01); *G06T 11/60* (2013.01); *G06T 2200/24* (2013.01); *H04Q 2011/0058* (2013.01)

(56) References Cited

U.S. PATENT DOCUMENTS

| | | | |
|---|---|---|---|
| 4,550,287 A | 10/1985 | Babcock | |
| 4,883,971 A | 11/1989 | Jensen | |
| 4,943,919 A | 7/1990 | Aslin et al. | |
| 5,060,889 A | 10/1991 | Nadkarni et al. | |
| 5,276,455 A | 1/1994 | Fitzsimmons et al. | |
| 5,294,075 A | 3/1994 | Vertatschitsch et al. | |
| 5,422,477 A | 6/1995 | De La et al. | |
| 5,467,942 A | 11/1995 | Abbas et al. | |
| 5,488,380 A | 1/1996 | Harvey et al. | |
| 5,760,379 A | 6/1998 | Matsen et al. | |
| 5,786,576 A | 7/1998 | Lunden | |
| 6,272,387 B1 | 8/2001 | Yoon | |
| 6,310,702 B1 | 10/2001 | Minami et al. | |
| 6,512,610 B1 * | 1/2003 | Minami | G01M 11/3136 356/73.1 |
| 6,547,448 B2 | 4/2003 | Johnson et al. | |
| 6,606,731 B1 | 8/2003 | Baum et al. | |
| 6,613,169 B2 | 9/2003 | Georgeson et al. | |
| 6,949,933 B2 | 9/2005 | Weaver | |
| 7,011,453 B1 | 3/2006 | Harres | |
| 7,055,435 B2 | 6/2006 | Lloyd | |
| 7,095,493 B2 | 8/2006 | Harres | |
| 7,119,336 B2 | 10/2006 | Allen et al. | |
| 7,139,674 B2 | 11/2006 | Switlik et al. | |
| 7,301,612 B2 | 11/2007 | Weaver | |
| 7,315,664 B2 | 1/2008 | Weaver | |
| 7,341,384 B2 | 3/2008 | Chan et al. | |
| 7,484,899 B2 | 2/2009 | Chan et al. | |
| 7,723,935 B2 | 5/2010 | Kneller et al. | |
| 7,823,451 B2 | 11/2010 | Sarr | |
| 7,887,008 B2 | 2/2011 | Lamoree et al. | |
| 7,893,645 B2 | 2/2011 | Kneller et al. | |
| 7,937,169 B2 | 5/2011 | Kneller et al. | |
| 8,180,562 B2 | 5/2012 | Clark et al. | |
| 8,310,223 B2 | 11/2012 | Hoffman et al. | |
| 8,393,212 B2 | 3/2013 | Ge et al. | |
| 8,417,113 B1 * | 4/2013 | Harres | H04B 10/032 398/10 |
| 8,494,663 B2 | 7/2013 | Lamoree et al. | |
| 8,600,651 B2 | 12/2013 | Clark et al. | |
| 8,645,113 B2 | 2/2014 | Sweers | |
| 8,682,173 B1 | 3/2014 | Hiller | |
| 8,745,864 B2 | 6/2014 | Kessler et al. | |
| 9,107,325 B1 | 8/2015 | Ihn et al. | |
| 9,110,167 B2 | 8/2015 | Cho et al. | |
| 9,404,904 B2 | 8/2016 | Puckett et al. | |
| 9,406,462 B2 | 8/2016 | Larsen et al. | |
| 9,480,163 B2 | 10/2016 | Kessler et al. | |
| 2005/0110979 A1 | 5/2005 | Harres | |
| 2005/0254038 A1 | 11/2005 | Harres | |
| 2005/0259242 A1 | 11/2005 | Bridge et al. | |
| 2008/0297773 A1 | 12/2008 | Blair et al. | |
| 2009/0148159 A1 * | 6/2009 | Schofield | H04B 10/071 398/40 |
| 2009/0190921 A1 * | 7/2009 | Nakajima | G01M 11/3136 398/13 |
| 2010/0063754 A1 * | 3/2010 | Thomas | G01R 31/086 702/59 |
| 2010/0225901 A1 | 9/2010 | Kassler et al. | |
| 2011/0153543 A1 | 6/2011 | Woodward et al. | |
| 2011/0153544 A1 * | 6/2011 | Nagel | G01M 11/3136 706/54 |
| 2015/0062562 A1 | 3/2015 | Kassler | |
| 2015/0085994 A1 * | 3/2015 | Koyabe | H04M 3/08 379/1.03 |
| 2017/0234768 A1 | 8/2017 | Viswanathan | |

OTHER PUBLICATIONS

US Patent and Trademark Office; Office Action for U.S. Appl. No. 15/432,223; dated Jul. 26, 2018.

* cited by examiner

SYSTEM AND METHOD FOR OPTICAL TIME-DOMAIN REFLECTOMETRY AND DESIGN DATA WIRE TESTING

CROSS REFERENCE TO RELATED APPLICATIONS

This application is a continuation of and claims priority to U.S. patent application Ser. No. 15/432,223, published as U.S. Patent App. Publication No. 2018/0234174, and entitled "System and Method for Optical Time-Domain Reflectometry and Design Data Wire Testing," the contents of which are hereby incorporated herein in their entirety.

FIELD OF THE DISCLOSURE

This disclosure relates generally to the field of optical time-domain reflectometry (OTDR) and more particularly to using OTDR data and design data in fiber optic testing.

BACKGROUND

Fiber optic cabling is increasingly used to place electrical systems in communication with each other in large vehicles, such as aircraft. During manufacturing, extensive testing is typically performed to ensure that fiber optic connections are functioning within established parameters in order to prevent malfunction when the vehicle has been placed into service. For example, a fiber optic cable, which may be made up of multiple fiber optic cable segments and connectors (informally referred to as a common copper path despite the lack of copper wiring) is tested to determine whether connectivity has been established through each connector along the pathway and whether signal attenuation within the pathway is within a desired threshold.

Typical testing methods include the use of a fiber optic testing device to generate OTDR data pertaining to a fiber optic pathway. By analyzing the OTDR data, a technician can determine approximate distances along the pathway to discontinuities and approximate attenuation factors along the pathway. However, having no data regarding the length of the pathway within the vehicle, technicians may inadvertently configure the fiber optic testing device for a distance that is much longer than the pathway under test making it difficult to determine the precise location of a discontinuity. Further, the technician may be required to consult multiple other databases to associate a discontinuity with a particular connector or fiber optic wire. The technician may also be required to consult still additional databases to discover a location of the discontinuity within the vehicle. As such, typical testing methods are very time consuming.

SUMMARY

In an embodiment, a system for testing continuity of a cable assembly includes an optical time domain reflectometry (OTDR) device configured to selectively couple to an input connector of a cable. The system also includes a design database storing cable data, the cable data indicating at least a length of the cable. The system includes a processor and a memory in communication with the processor. The processor is configured to execute instructions stored on the memory which cause the processor to receive the cable data from the design database. The instructions further cause the processor to receive OTDR data associated with the cable from the OTDR device. The instructions also cause the processor to calculate a distance-to-fault based on the OTDR data. The instructions cause the processor to, in response to the distance-to-fault being less than the length of the cable, determine that a connectivity failure has occurred with the cable and generate fault data indicating the connectivity failure.

In some embodiments, the cable includes a first cable segment and a second cable segment and further includes an intermediate connector disposed between the first and second cable segments for communicatively coupling the first and second cable segments to one another. In some embodiments, the cable data further indicates a distance from the input connector of the cable to the intermediate connector, and the instructions further cause the processor to compare the distance-to-fault to the distance from the input connector of the cable to the intermediate connector. The instructions also cause the processor to, in response to the distance-to-fault being substantially equal to the distance from the input connector of the cable to the intermediate connector, determine that the intermediate connector has failed. The fault data indicating the connectivity failure further identifies the intermediate connector. In some embodiments, the cable data further indicates a pathway of the cable within a vehicle and the instructions further cause the processor to generate 3-point vehicle coordinates indicating a position of a failure within the vehicle. The fault data indicating the connectivity failure further indicates the 3-point vehicle coordinates. In some embodiments, the system further comprises a user output device. The instructions further cause the processor to generate a graphical user interface that superimposes a graphical representation of the cable data with a graphical representation of the OTDR data and to send the graphical user interface to the user output device. In some embodiments, the system further comprises a second cable and a switching matrix configured to switch a coupling of the OTDR device between the cable and the second cable. In some embodiments, the instructions further cause the processor to calculate a signal loss associated with the cable based on the OTDR data. The instructions also cause the processor to, in response to the signal loss exceeding a threshold, determine that a signal loss failure has occurred within the cable and generate fault data indicating the signal loss failure.

In an embodiment, a method of testing cable continuity includes receiving cable data indicating at least a length of a cable for a vehicle from a design database. The method further includes receiving optical time domain reflectometry (OTDR) data associated with the cable from an OTDR device coupled to an input connector of the cable. The method also includes calculating a distance-to-fault based upon the OTDR data. The method includes comparing the distance-to-fault to the length of the cable. The method further includes providing an output based on the comparison.

In some embodiments, the method includes, in response to the distance-to-fault being less than the length of the cable, generating fault data indicating a failure with in the cable. The method also includes sending the fault data to a user output device. In some embodiments, the method includes, in response to the distance-to-fault being equal to the length of the cable, generating pass data indicating a successful test of the cable. The method further includes sending the pass data to the user output device. In some embodiments, the method includes, in response to the distance-to-fault being substantially greater than the length of the cable, generating error data indicating a testing error. The method further includes sending the error data to the user output device. In some embodiments, the cable data further indicates that the cable includes a first cable segment and a second cable segment and further includes an intermediate connector disposed between the first and second cable segments. In some embodiments the method includes comparing the distance-to-fault to the distance to the intermediate connector. The method further includes, in response to the distance-to-fault being substantially equal to the distance to the connector, determining that the connector has failed. The fault data further identifies the connector. In some embodiments, the method includes receiving user input indicating at least a vehicle, a connector, and a pin. The method further includes, before receiving the cable data, sending a request to the design database identifying the vehicle, the connector, and the pin. In some embodiments, the method includes generating 3-point vehicle coordinates indicating a position of a failure within the vehicle. The fault data further indicates the 3-point vehicle coordinates. In some embodiments, the method includes generating a graphical user interface that superimposes a graphical representation of the cable data with a graphical representation of OTDR data. The method further includes sending the graphical user interface to a user output device. In some embodiments, the method includes, in addition to generating the fault data, generating a failure report indicating 3-point vehicle coordinates of the failure, a cable bundle identifier associated with the failure, a cable identifier associated with the failure, a connector identifier associated with the failure, an identification of a type of failure, or any combination thereof. In some embodiments, the method includes calculating a signal peak associated with a connector based on the OTDR data. The method further includes, when the signal peak exceeds a threshold, generating warning data indicating the signal peak and the connector.

In an embodiment, a system for testing a cable assembly includes an OTDR device configured to selectively couple to an input connector of a cable. The system further includes a design database storing cable data, the cable data indicating at least a cable length. The system also includes a user output device. The system includes a processor and memory, the memory storing instructions that, when executed by the processor, cause the processor to receive the cable data from the design database. The instructions further cause the processor to receive OTDR data associated with the cable from the OTDR device. The instructions also cause the processor to generate a graphical user interface that superimposes a graphical representation of the cable data with a graphical representation of OTDR data. The instructions cause the processor to send the graphical user interface to a user output device.

In some embodiments, the instructions further cause the processor to calculate a distance-to-fault based on the OTDR data. The instructions also cause the processor to, in response to the distance-to-fault being less than the length of the cable, determine that a failure has occurred within the cable and generate fault data indicating the failure.

Figure 1:
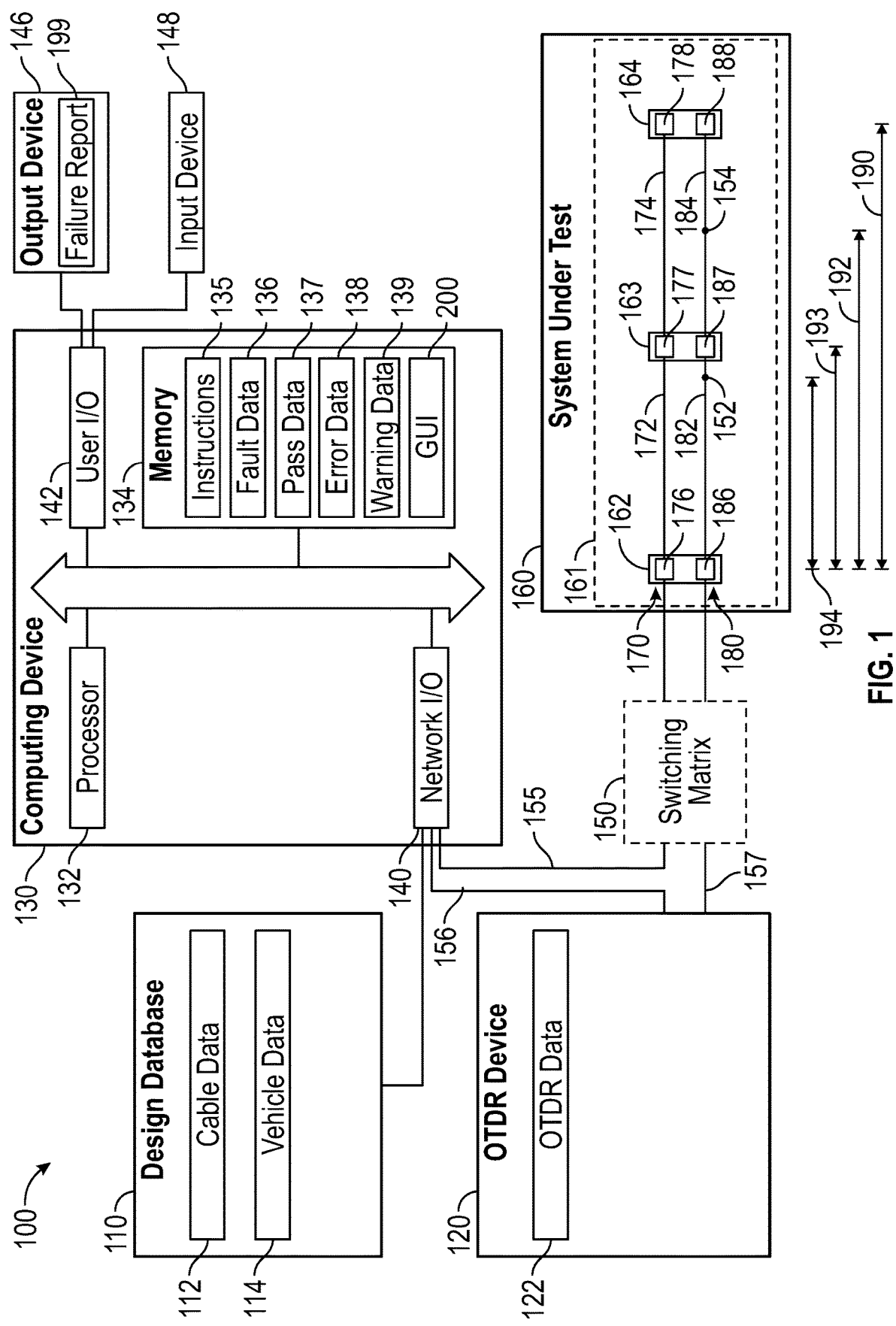
FIG. 1 depicts a block diagram of an embodiment of a system for testing the continuity of a cable assembly.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure.

DETAILED DESCRIPTION

Referring to FIG. 1, a block diagram of an embodiment of a system 100 for testing the continuity of a cable assembly 161 is depicted. The system 100 includes a design database 110, an OTDR device 120, and a computing device 130. The system 100 may further optionally include a switching matrix 150. The system 100 is configured to couple to a system under test 160, either directly, or via the switching matrix 150.

The design database 110 includes electrical and optical cabling configurations for multiple systems, allowing a user to select a particular system for testing. For example, the design database 110 may include cable data 112 and vehicle data 114 related to the system under test 160. The design database 110 may be implemented as a single database, as shown in FIG. 1, or as multiple databases. Further, the design database 110, or portions thereof, may be located remotely from the rest of the system 100 at one or more locations.

The cable data 112 identifies cable information related to the system under test 160, such as a position of cables, a length of the cables, connectors associated with the cables, additional information related to the cables, or combinations thereof. The system under test may have any combination of cable segments and connectors within a cable assembly 161. For illustration purposes, FIG. 1 depicts the cable assembly 161 as including a first cable 170 and a second cable 180. The first cable 170 is defined by connectors 162-164 and by a first set of cable segments 172, 174. Likewise, the second cable 180 is defined by the connectors 162-164 and by a second set of cable segments 182, 184. In some embodiments, the cables 170, 180 are fiber optic cables.

In the exemplary embodiment, each of the connectors 162-164 includes pins for communicatively connecting cable segments. For example, the input connector 162 includes a first pin 176 and a second pin 186. The intermediate connector 163 also includes a first pin 177 and a second pin 187. The end connector 164 includes a first pin 178 and a second pin 188. As used herein, the term "pin" refers to a fiber optic connection point at a terminus of an optical fiber. It is associated with an adapter or coupler that can be used to communicatively connect two or more fiber optic cable segments or to communicatively connect an optical source or detector to a fiber optic cable segment. The input connector 162 is coupled to the OTDR device 120. In some embodiments, the coupling takes place via the switching matrix 150 as described herein. The intermediate connector 163 is depicted as being disposed between the first cable segment 172 and the second cable segment 174 at its first pin 177 and between the first cable segment 182 and the second cable segment 184 at its second pin 187, providing a communicative couplings between segments. The end connector 164 is depicted as being positioned at a terminal or distal end of each of the cables 170, 180.

It should be noted that the system under test 160 is a simplified illustration. Although not depicted in FIG. 1, more than two cables and more than three connectors may be included in the system under test 160. Further, even though FIG. 1 depicts both the first cable 170 and the second cable 180 as including the same connectors 162-164, in other cases, the first cable 170 and the second cable 180 may take different paths through the system under test 160 and may include separate connectors. In practice, a system may include many cable segments and connectors, and may be configured to create an advanced network of connections.

The first cable 170 and the second cable 180 have a length 190. Although for simplicity, FIG. 1 depicts the first cable 170 and the second cable 180 as having the same length 190, in practice, each cable of the cable assembly 161 may have differing lengths. As stated above, the attributes of each of the connectors 162-164 and of each of the cable segments 172, 174, 182, 184, including their positions, their respective lengths 190, and the configuration in which they are coupled are described by the cable data 112. For example, the cable data 112 may indicate a distance 193 from the input connector 162 to the intermediate connector 163. Part numbers and other identifiers, associated with each of the connectors 162-164 and with each of the cable segments 172, 174, 182, 184, may also be included within the cable data 112.

In some embodiments, the system under test 160 corresponds to a vehicle, such as an aircraft. The vehicle data 114 includes information identifying a position of the first and second cables 170, 180 relative to the vehicle, e.g., relative to a location within the fuselage, relative to a location to another component mounted to the fuselage, etc. For example, the vehicle data 114 includes 3-point vehicle coordinates information associated with each of the connectors 162-164 and with each of the cable segments 172, 174, 182, 184. The vehicle data 114 further includes sufficient information to generate a 3-dimensional visualization of the vehicle to aid a technician in visualizing the system under test 160. It should be noted that in some embodiments, the design database 110 may omit the vehicle data 114, or the vehicle data 114 may be included as part of the cable data 112.

The OTDR device 120 includes one or more systems configured to perform OTDR testing for one or more cables. In general, OTDR testing includes generating an optical electromagnetic signal 157 and transmitting the optical electromagnetic signal through a selected cable, e.g., the cable 170 or the cable 180. A reflected signal is detected and recorded by the OTDR device 120 as a function of time. Based on the recorded reflected signal, the OTDR device 120 generates OTDR data 122. The OTDR data 122 includes a set of data points associated with the optical electromagnetic signal 157 and its reflections as defined by the reflected signal(s). In some embodiments, the OTDR device 120 may determine a distance-to-fault for the selected cable. In some alternative embodiments, the OTDR device 120 may generate raw data and the computing device 130 may be used to determine the distance-to-fault. The OTDR device 120 may be controlled via the computing device 130 through a control signal 156.

The OTDR device 120 is configured to selectively couple to the input connector 162. In some embodiments, a switching matrix 150 may be used to selectively switch the OTDR device 120 between the first cable 170 and the second cable 180. As such, the switching matrix 150 may be capable of passing an optical electromagnetic signal 157 between the OTDR device 120 and either the first cable 170 or the second cable 180. In cases where more than two cables are included in the system under test 160, the switching matrix 150 may further be capable of coupling the OTDR device 120 to the additional cables. In the exemplary embodiment, the switching matrix 150 is controlled via a signal 155 received from the computing device 130.

The computing device 130 includes a processor 132, memory 134, a network input/output 140, and a user input/output 142. A bus 144 couples the processor 132, the memory 134, the network input/output 140, and the user input/output 142 together to enable communication therebetween. Although only one bus 144 is depicted, the computing device 130 may include multiple busses or other types of communication pathways between any of its elements. The computing device 130 may further include additional hardware to facilitate the performance of communications and computations related to OTDR and design data wire testing as desired.

The processor 132 performs computations using a central processing unit (CPU), a graphical processing unit (GPU), a digital signal processor (DSP), a peripheral interface controller (PIC), or another type of microprocessor. It may be implemented as an integrated circuit, a field programmable gate array (FPGA), an application specific integrated circuit (ASIC), a combination of logic gate circuitry, other types of digital or analog electrical design components, or the like, or combinations thereof.

The memory 134 includes random access memory (RAM), read only memory (ROM), magnetic disk memory, optical disk memory, flash memory, another type of memory capable of storing data and processor instructions, or the like, or combinations thereof. In some embodiments, the memory 134, or portions thereof, may be located externally or remotely from the rest of the computing device 130. The memory 134 stores instructions 135. In an embodiment, the memory 134 includes a non-transitory computer readable medium (e.g., a remotely stored hard disk, a compact disc read only memory (CDROM), a digital video disc (DVD), an external memory drive, etc.) that stores the instructions 135. When executed by the processor 132, the instructions 135 cause the processor 132 to perform operations. The operations may correspond to any operations described herein for SSTDR and design data wire testing.

The memory 134 may, at times, also store fault data 136, pass data 137, error data 138, and warning data 139, which are generated by the processor 132 as described herein. The fault data 136 indicates whether one or more connectivity or signal loss failures have been detected in the system-under-test 160. The pass data 137 indicates that the system under test 160 or one or more of the cables 170, 180 has passed connectivity tests, signal loss tests, or both. The error data 138 indicates that an error has occurred while performing tests. The warning data 139 indicates that a portion of the system under test 160 has passed, but may have an issue that should be addressed.

The memory 134 may also store a GUI 200 for facilitating input and output from a user. The GUI may be sent to the output device 146 for display and may be manipulated by a user via the input device 148. The GUI 200 is further described with reference to FIG. 2. Additional data may also be stored at the memory 134 to facilitate the performance of communications and computations related to OTDR and design data wire testing as desired.

The network input/output 140 includes one or more networking devices to enable the computing device 130 to communicate with the design database 110, the OTDR device 120, and switching matrix 150. The network input/output 140 may include wireless connections, wired connections, or both, and may communicate via wide area network (WAN), local area network (LAN), serial peer-to-peer communication, another type of wired or wireless network communication, or the like, or combinations thereof.

The user input/output 142 includes one or more user input/output interfaces to enable the computing device 130 to communicate with a user. For example, the user input/output 142 may include a keyboard interface, a video interface, a mouse interface, an audio interface, another type of user interface, or the like, or combinations thereof.

The output device 146 is coupled to the user input/output 142 and enables the fault data 136, the pass data 137, the error data 138, the warning data 139, or combinations thereof to be output to a user. For example, the data may be output through the GUI 200. As such, the output device 146 includes hardware to present information to the user. To illustrate, the output device 146 may include a monitor, a screen, another type of visual display, or the like, or combinations thereof. In some embodiments, the output device 146 may be incorporated within the computing device 130.

An input device 148 is also coupled to the user input/output 142 and enables user input to be received by the computing device 130. As such, the input device 148 includes hardware to receive input. For example, the input device 148 may include a keyboard, a keypad, a mouse, a touchscreen, another type of input mechanism, or the like, or combinations thereof.

During operation, the computing device 130 receives user input, via the input device 148 indicating, for example, a vehicle, a connector, and a pin to be tested using the OTDR device 120. The user input may be received through the GUI 200 as described herein. The information is used to create a query for retrieving information descriptive of the system under test 160 from the design database 110. A request is sent to the design database 110 via the network input/output 140 that includes the identification of the vehicle, the connector, and the pin. Additional identification information, such as a job number, order number, or shop order number may also be included. The design database retrieves the cable data 112, the vehicle data 114, or both, based on the identification information and transmits the cable data 112, the vehicle data 114, or both to the computing device 130. The cable data 112 relates to a particular cable of the system under test 160, such as the first cable 170 or the second cable 180.

In addition to receiving the cable data 112 from the design database 110, the processor 132 generates a request for the OTDR data related to the selected cable (e.g., the first cable 170 or the second cable 180) from the OTDR device 120. In response to the request, the OTDR device 120 may perform an OTDR test on the first cable 170, the second cable 180, or both to generate the OTDR data 122.

In embodiments where the switching matrix 150 is included, the processor 132 may control the switching matrix 150 via the network input/output 140 to selectively couple the OTDR device 120 to the first cable 170 or the second cable 180, depending on which is selected. In other embodiments, the OTDR device may be manually coupled to either the first cable 170 or the second cable 180.

The processor 132 receives the OTDR data 122 from the OTDR device 120 via the network input/output 140. Based on the OTDR data 122, a distance-to-fault may be calculated by the processor 132. Alternatively, the OTDR device 120 may calculate the distance-to-fault and transmit the distance-to-fault as part of the OTDR data 122. As a test case, FIG. 1 depicts a connectivity failure 152 positioned in the first cable segment 182 of the second cable 180. The OTDR data 122 may indicate a distance-to-fault 194 associated with the failure 152. The processor 132 compares the distance-to-fault 194 to the length 190 of the cable being tested, which for purposes of discussion is the second cable 180. In response to the distance-to-fault 194 being substantially less than the length 190 of the second cable 180, the processor 132 determines that a connectivity failure has occurred with the second cable 180 and may generate the fault data 136 indicating the connectivity failure.

As used herein, a "distance-to-fault" is a measured distance between the input connector 162 and a point along the cable 180 at which either a sharp signal peak occurs or a sharp signal loss occurs in a reflected signal received by the OTDR device 120 such that no reflected signals are received from beyond that point. If there are no problems with the cable, then the distance-to-fault will correspond to the length 190 of the cable. However, if there is a connectivity failure, then the distance-to-fault will correspond to the connectivity failure. For example, the distance-to-fault 194 corresponds to the connectivity failure 152 of cable 180. Because the distance-to-fault 194 is substantially less than the length 190 of the cable 180, the processor 132 determines that a connectivity failure has occurred. The term "substantially less" means that the distance-to-fault 194 is less than the length 190 and also that the difference between the distance-to-fault 194 and the length 190 is greater than a threshold (e.g., 3-4 percent of the length 190). The threshold may be due to manufacturing variability, measurement accuracy, other uncertainties in the manufacturing process, etc.

Once the processor 132 has determined that a connectivity failure exists and has generated the fault data 136, the fault data 136 is sent to the output device 146 via the user input/output 142. As another example, the second cable 180 includes a failure 154 in the second cable segment 184 of the second cable 180. In this case, the distance-to-fault 192 is likewise substantially less than the length 190 of the second cable 180. Thus, the fault data 136 indicates a failure within the second cable segment 184.

To further illustrate, no failure may be present within the first cable 170. In that case, the distance-to-fault is substantially equal to the length 190 of the first cable 170 (having no failure within the first cable 170). In response to the distance-to-fault being substantially equal to the length 190 of the first cable 170, the processor 132 generates the pass data 137 indicating a successful test of the first cable 170. In this case, the pass data 137 is sent to the output device 146. The fault data 136 would not be generated in this case. As used herein, "substantially equal" means that the distance-to-fault falls within a threshold range of the length 190 of the cable 170. For example, the distance-to-fault may be within 3-4 percent of the length 190. The threshold may account for manufacturing variability, measurement accuracy, other uncertainties in the manufacturing process, etc.

In some cases, the distance-to-fault may be substantially greater than the length of the first cable 170. This indicates that an error has occurred. For example, the OTDR device 120 may be configured incorrectly or the system under test 160 may be incorrectly configured. In response to the error, the processor 132 generates the error data 138 indicating a testing error. The error data 138 may be sent to the output device 146. As used herein, "substantially greater than" means that the distance-to-fault is greater than the length 190 plus a threshold (e.g., 3-4 percent of the length 190). The threshold may account for manufacturing variability, measurement accuracy, other uncertainties in the manufacturing process, etc.

In each of these cases, sending data to the output device 146 may be facilitated through the generation of the GUI 200, as described herein. As part of the output generated by the processor 132 and sent to the output device 146, the GUI 200 may include a graphical representation of cable parameters that superimposes a graphical representation of the cable data with a graphical representation of OTDR data 122 and sends the graphical representation to the user output device 146.

During testing, the processor 132 may also compare the distance-to-fault to the distance 193 to the intermediate connector 163, which may be included in the cable data 112. In response to the distance-to-fault, as measured by the OTDR device 120, being substantially equal to the distance 193, the processor 132 determines that the intermediate connector 163 has failed. The fault data 136 may be updated to identify the intermediate connector 163. Further, the processor 132 may generate 3-point vehicle coordinate information indicating a position of a failure within a vehicle, as described further in FIGS. 3 and 4. The 3-point vehicle coordinates may be determined based on the vehicle data 114 and may be useful for a technician to determine the location of a faulty connector or cable segment. The fault data 136 may also include the 3-point vehicle coordinates. In addition to generating the fault data 136, the processor 132 may also generate a failure report indicating additional information, such as the 3-point vehicle coordinates of the failure, a cable bundle identifier associated with the failure, a cable identifier associated with the failure, a connector identifier associated with the failure, an identification of a type of failure, or any combination thereof. As used herein, 3-point vehicle coordinates include a 3-coordinate vector that identifies a precise location within a fuselage of an aircraft or other vehicle. A cable bundle identifier identifies a particular cable bundle within the aircraft or vehicle. A cable bundle is a set of cable following the same path through at least a portion of the aircraft or vehicle. For example, the first cable 170 and the second cable 180 are a cable bundle. Each cable bundle is associated with an identifier within the cable data 112. Likewise, each connector within the cable data 112 is associated with an identifier and each cable is associated with an identifier. The type of failure associated with a cable includes either a connectivity failure, a signal loss failure, or a combination of both, and is identified by a number or string of characters. Each of these identifiers may be compiled from the cable data 112, the vehicle data 114, another database, or combinations thereof.

In some cases, it may be beneficial to use the OTDR data 122 to update particular portions of the database 110. For example, in some embodiments, the database 110 may additionally store actual measured lengths of cables in addition to the designed lengths of the cables. Likewise, the design database 110 may store actual measured distances between connectors in addition to designed distances between connectors. During testing, it may be discovered that the actual measured data is not accurate. In that case, the OTDR data 122 may be used to revise the actual measured data to improve accuracy. The actual measured data may be used enable failures within cables to be located more precisely.

In addition to determining whether a connectivity failure is present within the system under test 160, the system 100 may determine whether a signal loss failure exists. For example, the processor 132 may calculate a signal loss associated with the first cable 170 based on the OTDR data 122. In response to the signal loss exceeding a threshold, the processor 132 determines that a signal loss failure has occurred within the first cable 170 and generates fault data 136 indicating the signal loss failure. An example of a suitable loss threshold may be about 5 decibels. Likewise, the processor 132 may determine whether a warning condition exists. For example, the processor 132 may calculate a signal peak associated with each connector 162-164 based on the OTDR data 122. When the signal peak exceeds a threshold, the processor 132 may generate the warning data 139 indicating the signal peak and identifying the connector 162-164. The warning data 139 may be sent to the output device 146 to be viewed by a user. An example of a signal peak and a warning condition is further described with reference to FIG. 2.

After tests are completed on the first cable 170, the second cable 180 may be tested in a similar manner. For example, the OTDR device 120 may be disconnected from the first cable 170 and connected to the second cable 180. This may occur either manually, or through the use of the switching matrix 150. In some embodiments, the testing may be automatically controlled by the computing device 130 and each cable of the system under test 160 may be iteratively tested.

A benefit of the system 100 is that testing may be performed on a pass/fail basis, limiting the amount of analysis and data compilation required by a technician. Another benefit of the system 100 is that data from the design database 110 and from the OTDR device 120 may be graphically superimposed to simplify the amount of time required by technicians to analyze the system under test 160, identify the specific location of a fault, and reduce the chance for human error. Thus, the amount of time required for testing and repairing a fiber optic system may be reduced.

Figure 2:
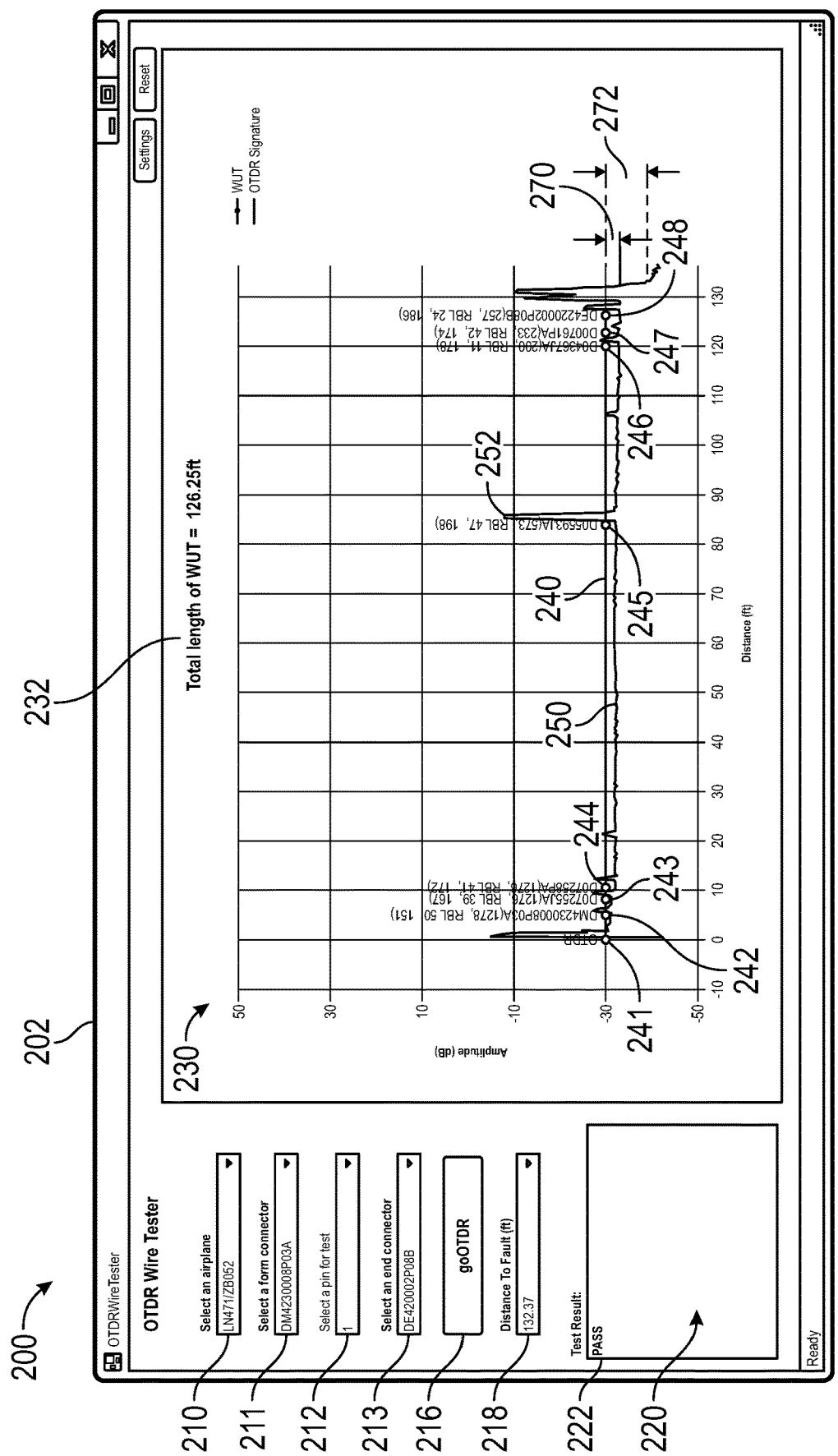
FIG. 2 depicts an embodiment of a graphical user interface (GUI) for use with the system for testing the continuity of a cable assembly when the tested cable passes the continuity testing.

Referring to FIG. 2, an embodiment of the GUI 200 for use with the system 100 as described above. The GUI 200 may include a display window 202. In the illustrative embodiment, the display window 202 includes various inputs such as a vehicle selection input 210, an input connector selection input 211, a pin selection input 212, and an end connector selection input 213. The window 202 may further include an OTDR request button 216. The window 202 may further include various outputs including a distance to fault output 218, a test results output area 220, a display output 230, and a cable length output 232.

In the exemplary embodiment, to test a cable, a user initially selects the particular vehicle to be tested using the vehicle selection input 210. Subsequently, the user selects an input connector using the connector selection input 211. For example, the user may select the input connector 162. The input connector 162 is the connector that an associated OTDR device, e.g., the OTDR device 120 is connected to. The user then selects a particular pin of the input connector using the pin selection input 212. Finally, a user selects an end connector using the end connector selection input 213. Based on the selected input connector, the selected pin, and the selected end connector, a query is generated to retrieve information regarding a cable within the vehicle. The information includes an identification of and position of connectors associated with the cable, as well as distances between the connectors and a length of the cable. This information may be used to generate a visual depiction of the cable. For example, the display output 230 may include a graphical representation 240 of the cable. In the example of FIG. 2, the graphical representation 240 of the cable data includes connectors 241-248, which are plotted to show the distances between them.

The user may further select the OTDR request button 216 to initiate completion of an OTDR test on the selected cable. Based on OTDR data received as a result of the OTDR test, a graphical representation 250 of the OTDR data is generated. The graphical representation 240 of the cable data and the graphical representation 250 of the OTDR data are superimposed to permit a technician to easily analyze the data without having to refer to multiple sources. A distance-to-fault associated with the cable may be displayed at the distance-to-fault output 218. When the distance to fault is substantially equal to the length of the cable, then a pass indication 222 is displayed in the test results output area 220. As used herein, a distance-to-fault is substantially equal to the length of the cable when a difference between the distance-to-fault and the length of the cable is within a threshold, taking into account instrumentation accuracy and a length of any additional cabling used to connect the OTDR device to the cable. For example, FIG. 2 depicts the distance-to-fault output 218 as showing a measured distance-to-fault (e.g., the distance to fault 192 or the distance to fault 194) as being 132.37 feet and the length of the cable being tested (e.g., the length 190 of the second cable 180) as 126.25 feet. For purposes of this application, these distances are considered substantially equal.

The display output 230 may further show a signal loss 270 associated with the OTDR data 122. For example, the signal loss 270 may be a difference in amplitude between a position at the connector 241 and a position at the connector 248. Referring to FIG. 1, the signal loss may be a difference in amplitude between a position at the input connector 162 and a position at the end connector 164. In the example of FIG. 2, the signal loss 270 is within an acceptable signal loss threshold 272.

Although the cable of the example of FIG. 2 has passed the test, high signal peak measurements associated with connectors may, in some cases, be a cause for concern. In that case, a warning condition may exist. For example, a signal peak 252 which appears to be associated with the connector 245 may in some cases exceed a threshold, causing a warning to be issued to a technician. To illustrate, the warning data 139 may be generated and may include an identification of the connector 245 Although not shown in FIG. 2, the warning may be displayed at the test results output area 220.

By providing a user with a graphical representation that superimposes cable data with OTDR data, the GUI 200 may enable a technician to review test results without referring to multiple sources independently, saving time and reducing the risk of error. Other benefits of the GUI 200 may exist.

Figure 3:
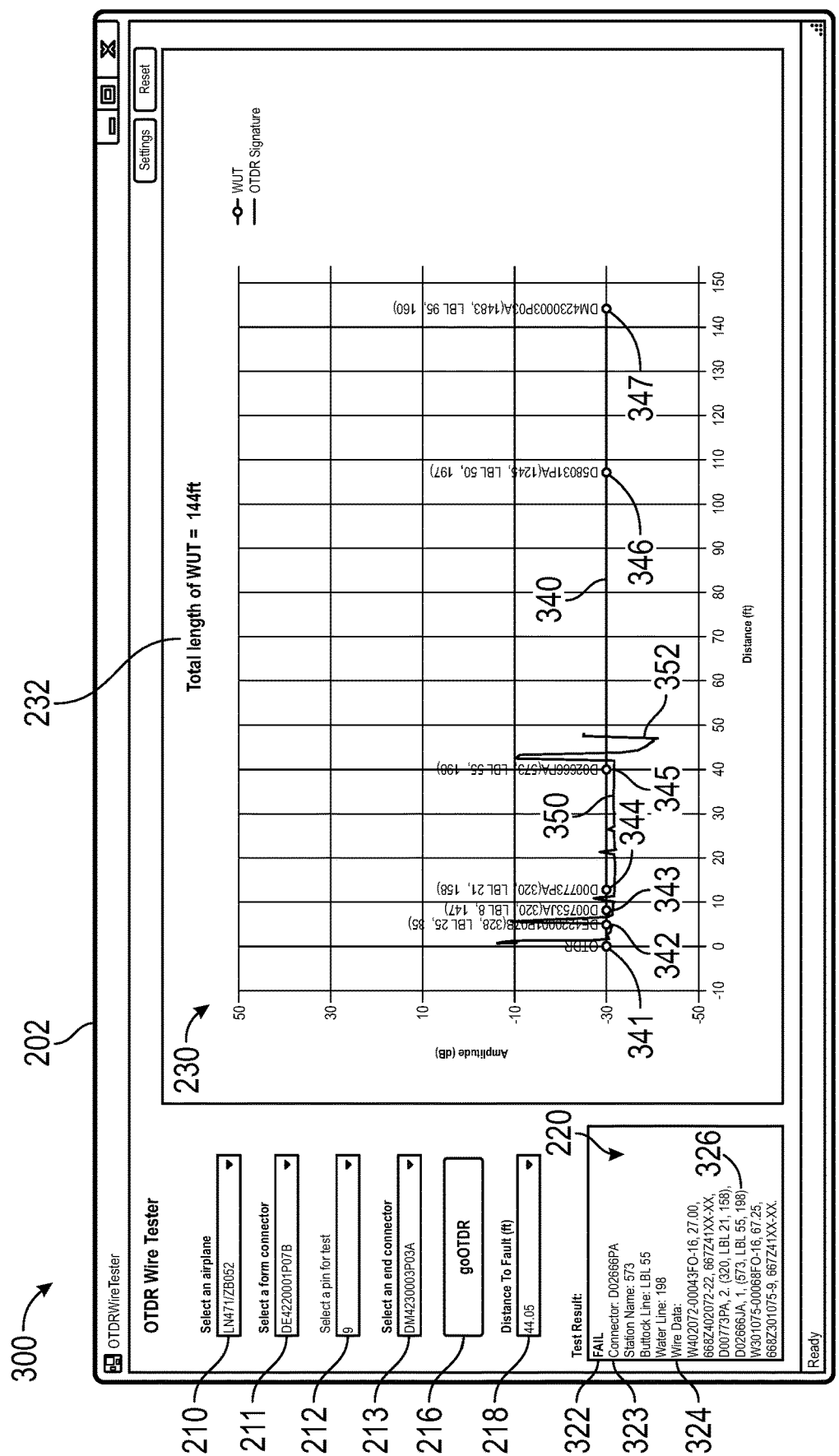
FIG. 3 depicts an embodiment of a GUI for use with the system for testing the continuity of a cable assembly when a failure is detected in the cable assembly.

Referring to FIG. 3, an embodiment of a GUI 300 for use with the system 100 is depicted. In the example of FIG. 3, a tested cable has not passed one or more tests as described herein. For example, the distance-to-fault of the example of FIG. 3, as shown by the distance-to-fault output 218 is 44.05 feet, which is substantially less than the length of the cable. The length of the cable, as shown by the cable length output 232 is 144 feet. Thus, the test results output area 220 includes a fail indication 322. The output area 220 may further include an indication 323 of a connector associated with the failure within the cable. Another indication 324 of additional data associated with the cable and the connector may also be included. For example, the additional information may include a 3-point position 326 of the connector, a part number associated with the connector or cable, a shop order number associated with the connector or cable, other information for aiding a technician to repair the cable, or combinations thereof.

In the example of FIG. 3, the display output 230 includes a graphical representation 340 of the failed cable. In the example of FIG. 3, the graphical representation 340 of the cable data includes connectors 341-347, which are plotted to show the distances between them. A graphical representation 350 of the OTDR data is superimposed over the graphical representation 340. The resulting display shows that a signal loss peak 352 has occurred at approximately 44 feet, and that the nearest connector is the connector 345. By plotting this information together, a technician does not have to consult multiple sources to determine were a failure took place within the cable. Other benefits of the GUI 300 may exist.

Figure 4:
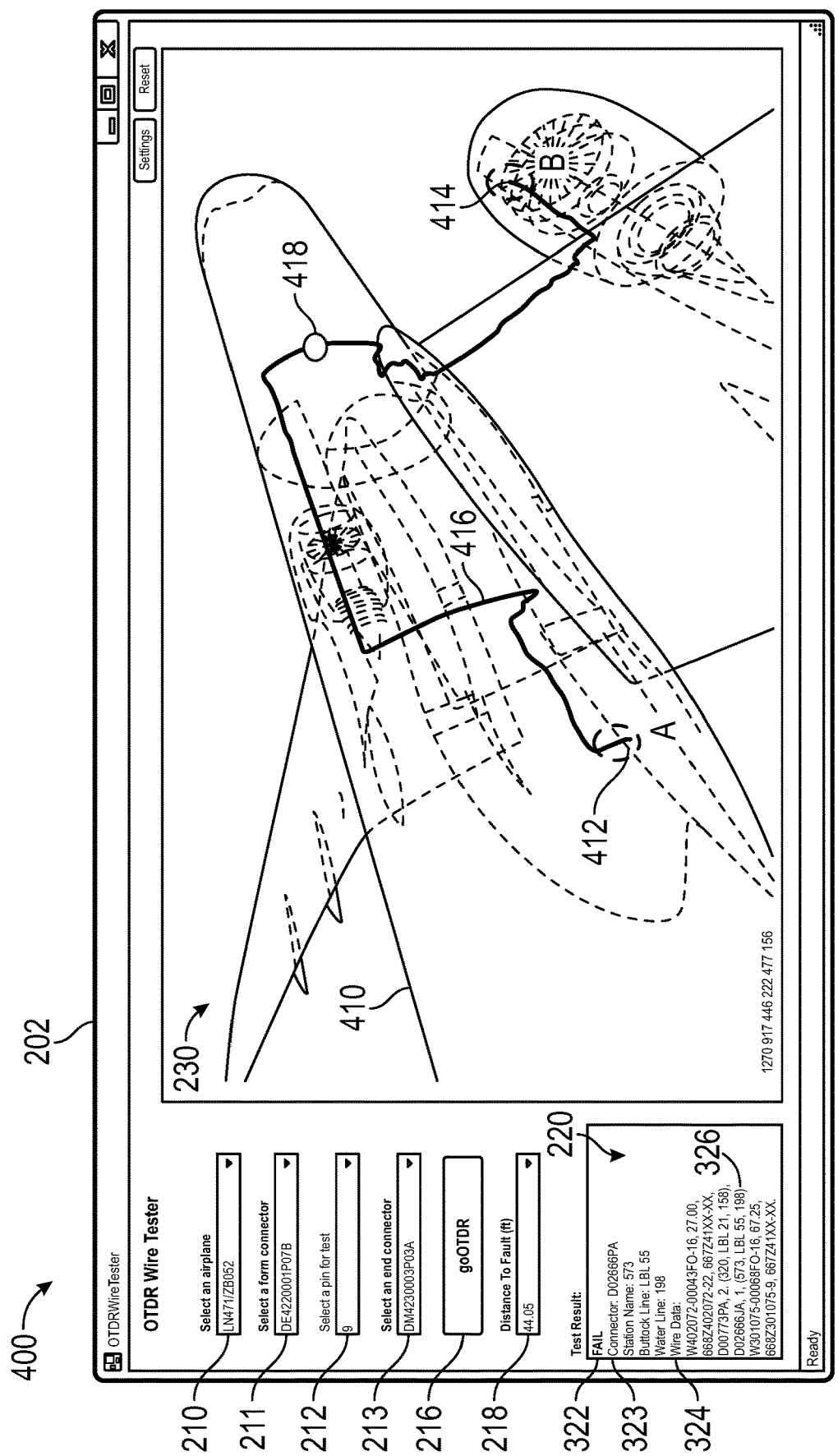
FIG. 4 depicts an embodiment of a GUI for use with the system for testing the continuity of a cable assembly.

Referring to FIG. 4, an embodiment of a GUI 400 for use with the system 100 is depicted. In the example of FIG. 4, a tested cable has not passed one or more tests as described herein. In this case, the display 230 may include a 3-dimensional representation 410 of a vehicle associate with the tested cable. An input connector 412 and an end connector 414 of the cable may be depicted and the pathway 416 taken by the cable may be shown in the 3-dimensional representation 410. A location of the failure within the cable may be depicted by a position 418. A user may be able to switch between the graphical representations depicted in FIGS. 2 and 3 and the 3-dimensional representation 410 to aid the user in locating a failed portion of a cable.

Figure 5:
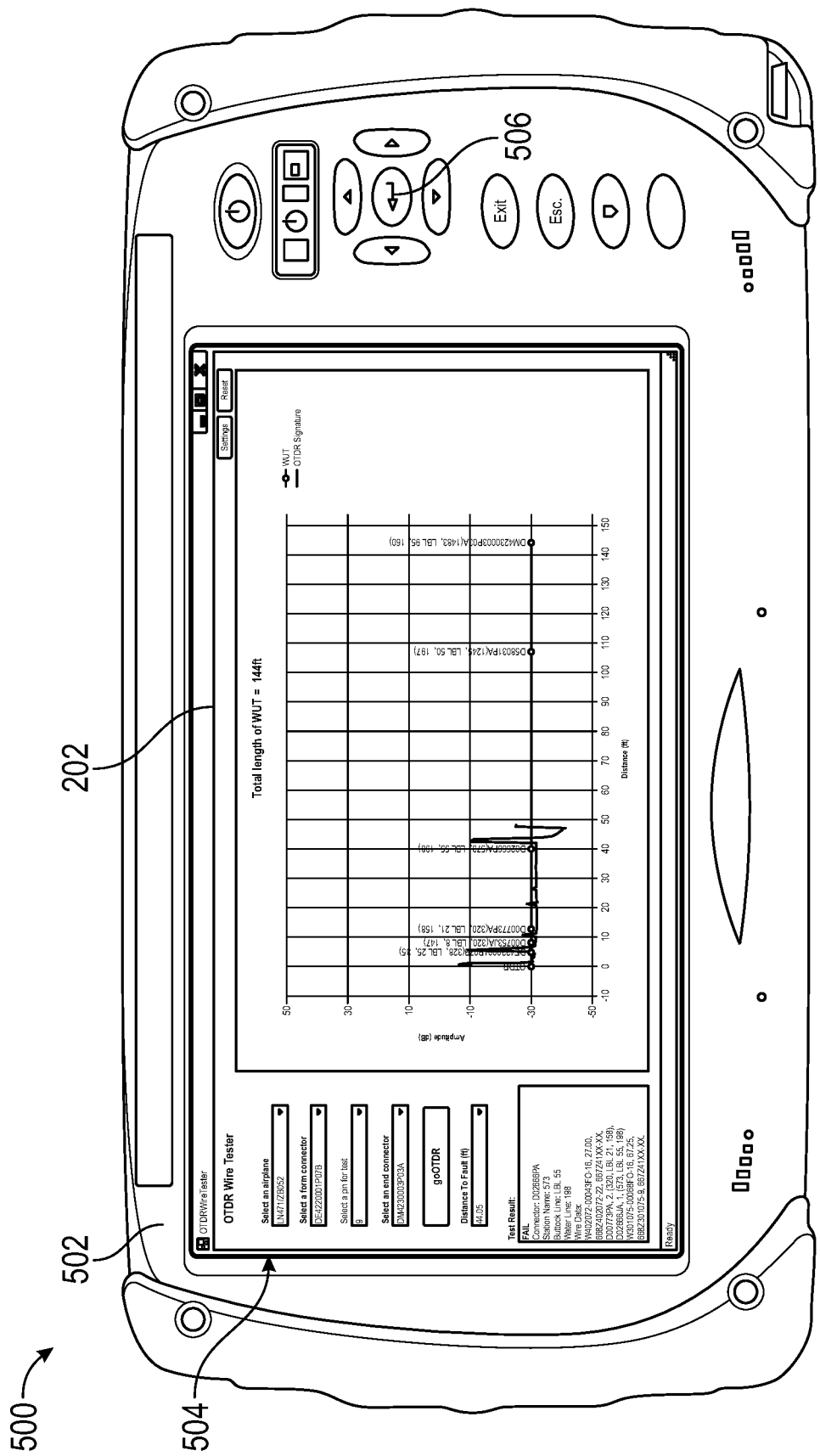
FIG. 5 depicts an embodiment of a system for testing the continuity of a cable assembly.

Referring to FIG. 5, an embodiment of a system 500 for testing the continuity of a cable assembly is depicted. The system 500 may correspond to the system 100 and may be incorporated into a handheld user device 502. The handheld user device 502 includes an output display 504 and an input keypad 506. The output display 504 may correspond to the user output device 146 and the input keypad 506 may correspond to the user input device 148. For example, the output display 504 may display the display window 202 and the computing device 130 may receive input through the input keyboard 506. By incorporating the system 100 into the handheld user device 502, the system 500 may be mobile enough to test portions of a vehicle that would otherwise be difficult to access with typical testing equipment. Other benefits of the system 500 may exist.

Figure 6:
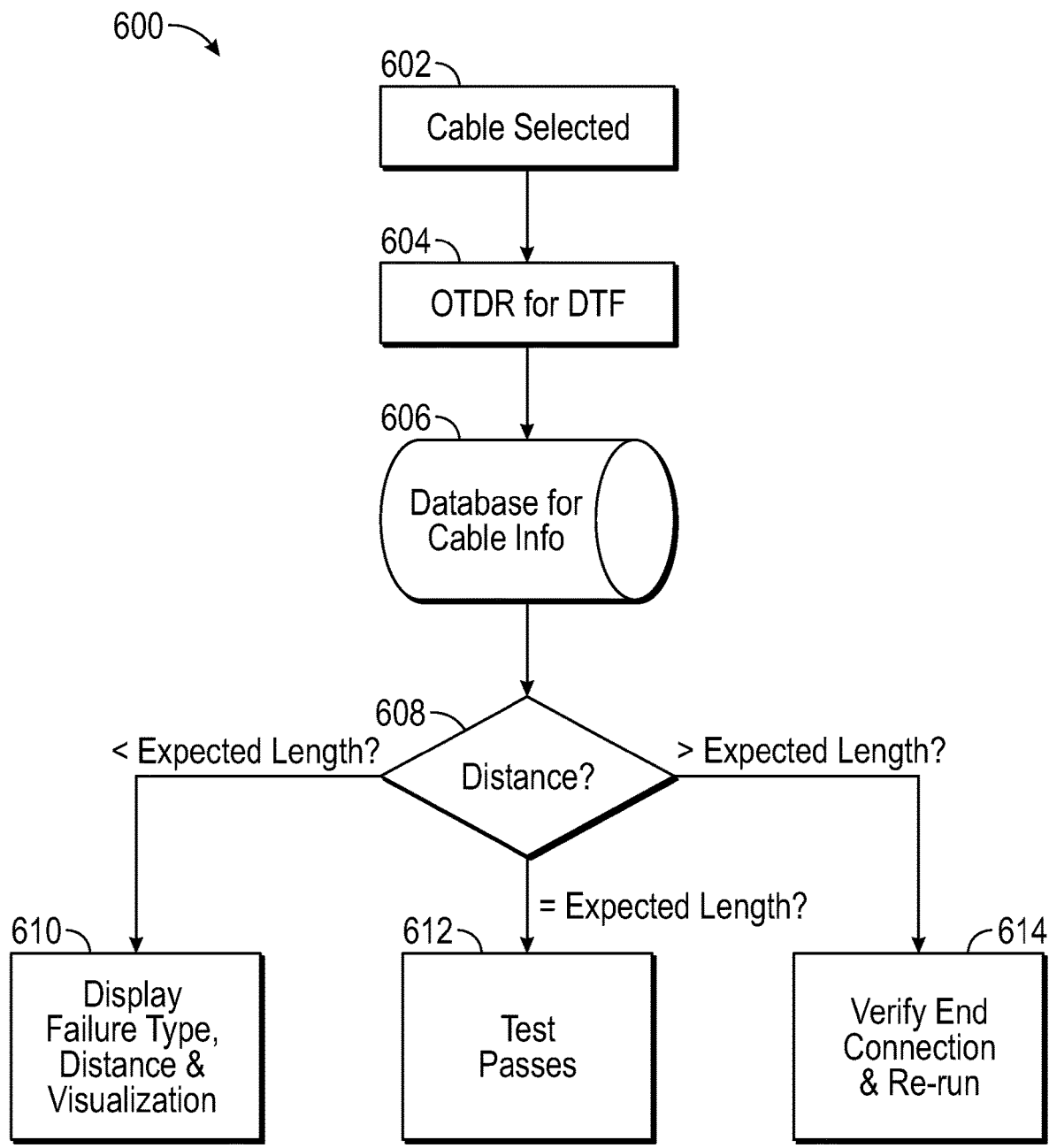
FIG. 6 depicts a flow chart of an embodiment of a method for testing the continuity of a cable assembly.

Referring to FIG. 6, a flow chart of an embodiment of a method 600 for testing the continuity of a cable assembly is depicted. The method 600 includes selecting a cable for testing, at 602. For example, using the input device 148, a user may provide the computing device 130 with an indication of a vehicle, a connector, and a pin, to enable the computing device 130 to determine which cable is selected for testing. The computing device 130 may automatically direct the switching matrix 150 to connect the OTDR device 120 to the selected cable. Alternatively, the user may manually connect the OTDR device 120 to the input connector 162 to either the cable 170 or the cable 180.

The method 600 further includes performing an OTDR test on the selected cable and determining a distance-to-fault, at 604. For example, the OTDR device 120 may perform an OTDR test on the cable 170 or the cable 180 to generate the OTDR data 122. The OTDR device 120 may then determine a distance-to-fault, which may be included in the OTDR data 122. Alternatively, the OTDR device may only include raw data in the OTDR data 122 and the computing device 130 may calculate the distance-to-fault based on the raw data.

The method 600 also includes receiving cable data associated with the selected cable, at 606. For example, the computing device 130 may generate one or more queries to the design database 110 to retrieve the cable data 112. The cable data 112 may indicate at least a length of the selected cable installed on the system under test 160 in the vehicle.

The method 600 includes comparing the distance-to-fault to the length of the cable, at 608. In response to the distance-to-fault being substantially less than the length of the cable, the method 600 may include generating fault data indicating a failure with in the cable, at 610. For example, the computing device 130 may generate the fault data 136. The computing device 130 may then send the fault data 136 to the output device 146 to be viewed by a user.

In response to the distance-to-fault being substantially equal to the length of the cable, the method 600 includes generating pass data indicating a successful test of the cable, at 612. For example, the computing device 130 may generate the pass data 137. The pass data 137 may then be sent to output device 146

In response to the distance-to-fault being substantially greater than the length of the cable, the method 600 includes generating error data instructing a user to verify connections associated with the cable, at 614. For example, the computing device may generate the error data 138, which may be presented to a user via the output device 146.

A benefit of the method 600 is that testing may be performed on a pass/fail basis, limiting the amount of analysis and data compilation required by a technician. Another benefit of the method 600 is that data multiple databases may be graphically superimposed to simplify the analysis of technicians and reduce the chanced for human error. Thus, the amount of time required for testing may be drastically reduced. Other benefits and advantages of the method 600 may exist.

Although various embodiments have been shown and described, the present disclosure is not so limited and will be understood to include all such modifications and variations are would be apparent to one skilled in the art.

What is claimed is:

1. A system for testing continuity of a cable assembly, the system comprising:
   an optical time domain reflectometry (OTDR) device configured to selectively couple to an input connector of a cable, wherein the cable includes a first cable segment, a second cable segment, and an intermediate connector disposed between the first and second cable segments for communicatively coupling the first and second cable segments to one another;
   a design database storing cable data, the cable data indicating at least a length of the cable, wherein the cable data further indicates a pathway of the cable within a vehicle, wherein the cable data further indicates a distance from the input connector of the cable to the intermediate connector;
   a processor and memory in communication with the processor, the processor configured to execute instructions stored on the memory which cause the processor to:
      receive the cable data from the design database;
      receive OTDR data associated with the cable from the OTDR device;
      calculate a distance-to-fault based on the OTDR data;
      in response to the distance-to-fault being less than the length of the cable, determine that a connectivity failure has occurred with the cable and generate fault data indicating the connectivity failure;
      generate 3-point vehicle coordinates indicating a position of a failure within the vehicle, wherein the fault data indicating the connectivity failure further includes a numerical representation of the 3-point vehicle coordinates;
      compare the distance-to-fault to the distance from the input connector of the cable to the intermediate connector; and
      in response to the distance-to-fault being substantially equal to the distance from the input connector of the cable to the intermediate connector, determine that the intermediate connector has failed, wherein the fault data indicating the connectivity failure further includes a part number that identifies the intermediate connector.

2. The system of claim 1, further comprising:
   a user output device, wherein the instructions further cause the processor to generate a graphical user interface that superimposes a graphical representation of the cable data with a graphical representation of the OTDR data and to send the graphical user interface to the user output device.

3. The system of claim 1, further comprising:
   a second cable; and
   a switching matrix configured to switch a coupling of the OTDR device between the cable and the second cable.

4. The system of claim 1, wherein the instructions further cause the processor to:
   calculate a signal loss associated with the cable based on the OTDR data; and
   in response to the signal loss exceeding a threshold, determine that a signal loss failure has occurred within the cable and generate fault data indicating the signal loss failure.

5. The system of claim 1, wherein the cable data is generated before the OTDR device is coupled to the connector, and wherein the OTDR data differs from the cable data.

6. A method of testing cable continuity comprising:
   receiving user input indicating a vehicle, a connector, and a pin;
   sending a request to a design database identifying the vehicle, the connector, and the pin;
   after sending the request to the design database, receiving cable data from the design database indicating at least a length of a cable coupled to the connector at the pin for the vehicle, wherein the cable data further indicates a distance from an input connector of the cable to an intermediate connector:
   receiving optical time domain reflectometry (OTDR) data associated with the cable from an OTDR device coupled to an input connector of the cable;
   calculating a distance-to-fault based upon the OTDR data;
   comparing the distance-to-fault to the length of the cable;
   comparing the distance-to-fault to the distance from the input connector of the cable to the intermediate connector;
   in response to the distance-to-fault being substantially equal to the distance from the input connector of the cable to the intermediate connector, determining that the intermediate connector has failed;
   providing an output based on said comparing;
   in response to the distance-to-fault being less than the length of the cable, generating fault data indicating a failure within the cable, and a part number that identifies the intermediate connector; and
   sending the fault data to a user output device.

7. The method of claim 6, further comprising:
generating 3-point vehicle coordinates indicating a position of a failure within the vehicle, wherein the fault data further indicates the 3-point vehicle coordinates.

8. The method of claim 6, further comprising:
in addition to generating the fault data, generating a failure report indicating 3-point vehicle coordinates of the failure, a cable bundle identifier associated with the failure, a cable identifier associated with the failure, a connector identifier associated with the failure, an identification of a type of failure, or any combination thereof.

9. The method of claim 6, further comprising:
in response to the distance-to-fault being substantially equal to the length of the cable, generating pass data indicating a successful test of the cable; and
sending the pass data to a user output device.

10. The method of claim 6, further comprising:
in response to the distance-to-fault being greater than the length of the cable, generating error data indicating a testing error; and
sending the error data to a user output device.

11. The method of claim 6, wherein the cable data further indicates that the cable includes a first cable segment and a second cable segment and further includes an intermediate connector disposed between the first and second cable segments.

12. The method of claim 11, further comprising:
comparing the distance-to-fault to the distance to the intermediate connector; and
in response to the distance-to-fault being substantially equal to the distance to the intermediate connector, determining that the intermediate connector has failed.

13. The method of claim 6, further comprising:
generating a graphical user interface that superimposes a graphical representation of the cable data with a graphical representation of OTDR data; and
sending the graphical user interface to a user output device.

14. The method of claim 6, further comprising:
calculating a signal peak associated with the connector based on the OTDR data; and
when the signal peak exceeds a threshold, generating warning data indicating the signal peak and the connector.

15. The method of claim 6, wherein said receiving cable data from the design database indicating at least a length of a cable coupled to the connector at the pin for the vehicle occurs before receiving the OTDR data, and wherein the OTDR data differs from the cable data.

16. A system for testing a cable assembly, the system comprising:
an optical time domain reflectometry (OTDR) device configured to selectively couple to an input connector of a cable;
a design database storing cable data, the cable data indicating at least a cable length a part number associated with at least one connector, and a distance from an input connector of the cable to an intermediate connector;
a user output device; and
a processor and memory, the memory storing instructions that, when executed by the processor, cause the processor to:
receive the cable data from the design database;
receive OTDR data associated with the cable from the OTDR device;
calculate a distance-to-fault based on the OTDR data;
in response to the distance-to-fault being less than the cable length, determine that a failure has occurred within the cable and generate fault data indicating the failure, and a part number that identifies the intermediate connector;
generate 3-point vehicle coordinates indicating a position of the failure within a vehicle;
compare the distance-to-fault to the distance from the input connector of the cable to the intermediate connector;
in response to the distance-to-fault being substantially equal to the distance from the input connector of the cable to the intermediate connector, determine that the intermediate connector has failed;
generate a graphical user interface that superimposes a graphical representation of the cable data, including a numerical representation of the part number associated with the at least one connector, with a graphical representation of OTDR data, wherein the graphical user interface further includes a numerical representation of the 3-point vehicle coordinates; and
send the graphical user interface to the user output device.

17. The system of claim 16, wherein the instructions further cause the processor to:
receive user input indicating a vehicle, the connector, and a pin.

18. The system of claim 17, wherein the instructions further cause the processor to:
send a request to the design database, wherein the request identifies the vehicle, wherein the request also identifies the connector, wherein the request also identifies the pin, and wherein the cable data is received in response to the request.

19. The system of claim 17, further comprising:
sending a request to the design database, wherein the request identifies the vehicle, the connector, the pin, or any combination thereof, and wherein the cable data a received in response to the request.

20. The system of claim 16, wherein the cable data is generated before the OTDR is coupled to the input connector of the cable, and wherein the OTDR data differs from the cable data.

* * * * *